May 13, 1958 E. S. WHITE 2,834,049
TIRE RETREADING MOLD WITH MECHANICAL TIRE EXPANDER ASSEMBLY
Filed Sept. 2, 1954 5 Sheets-Sheet 1
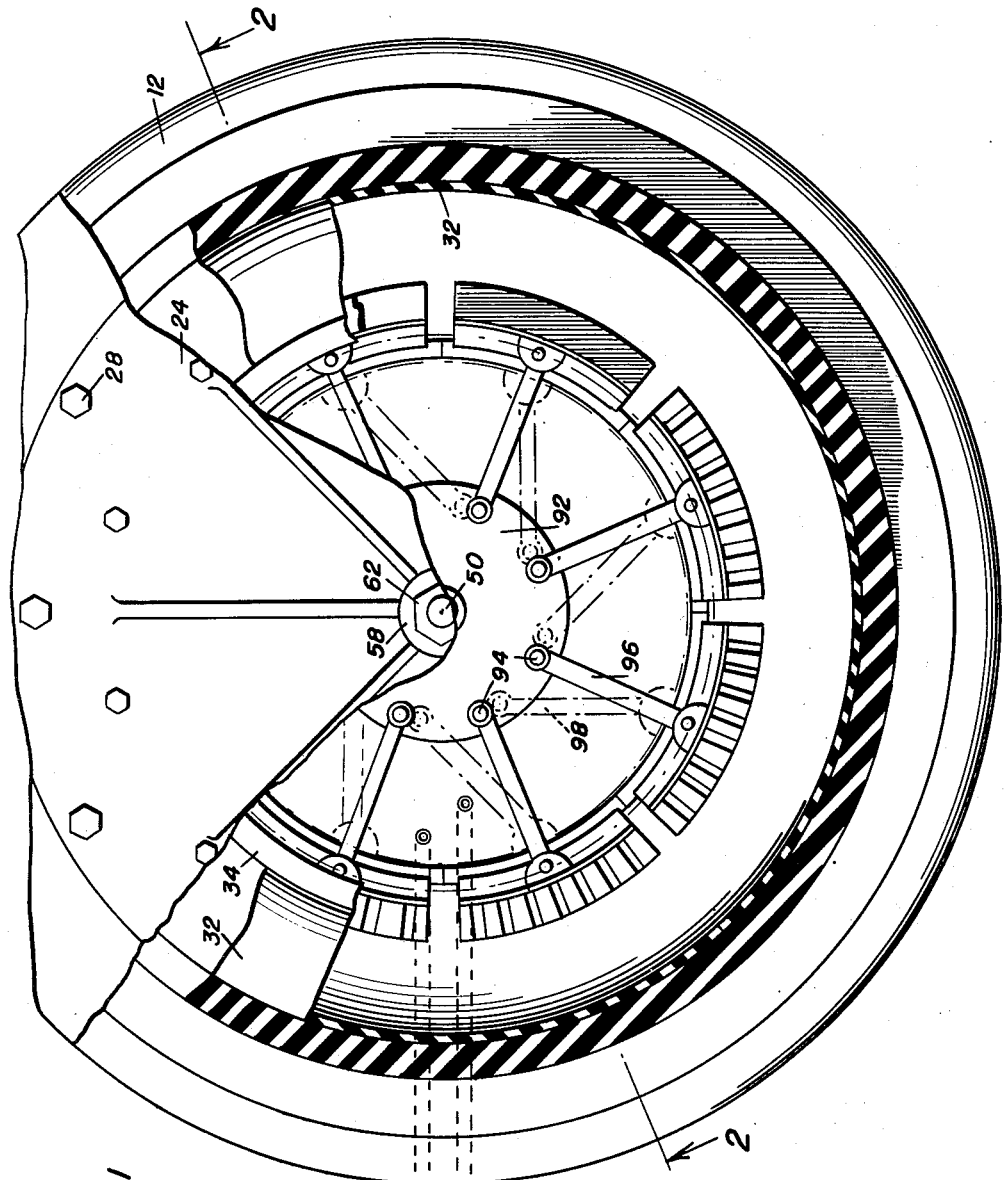
Fig.1
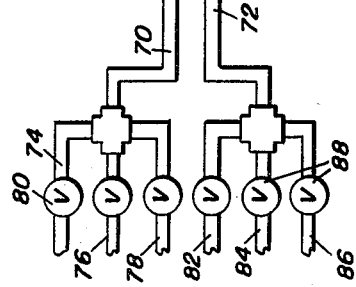
Eldridge S. White
INVENTOR.
BY *Clarence A. O'Brien*
and *Harvey B. Jacobson*
Attorneys May 13, 1958 E. S. WHITE 2,834,049
TIRE RETREADING MOLD WITH MECHANICAL TIRE EXPANDER ASSEMBLY
Filed Sept. 2, 1954 5 Sheets-Sheet 2

Eldridge S. White
INVENTOR.

BY *Clarence A. O'Brien*
*and Harvey B. Jacobson*
Attorneys

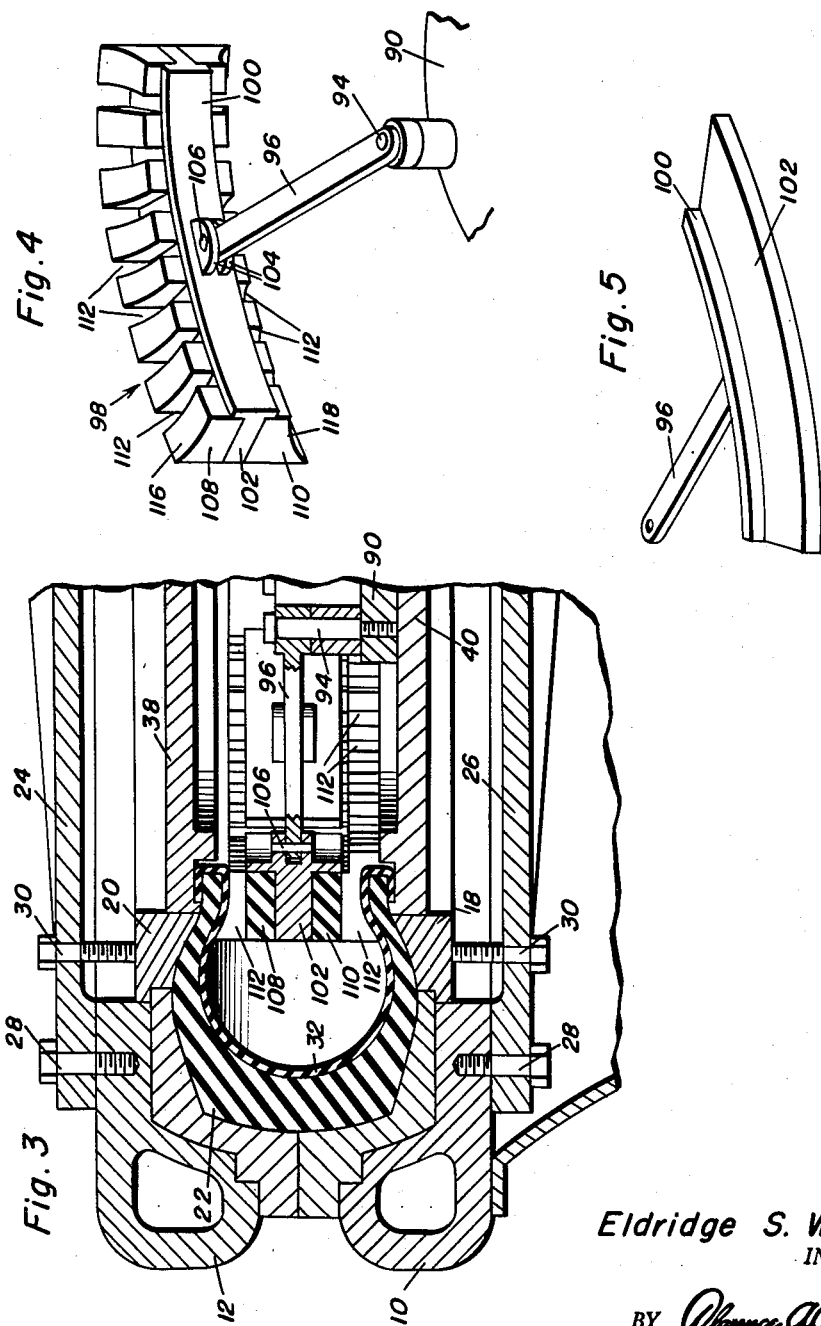

Eldridge S. White
INVENTOR.

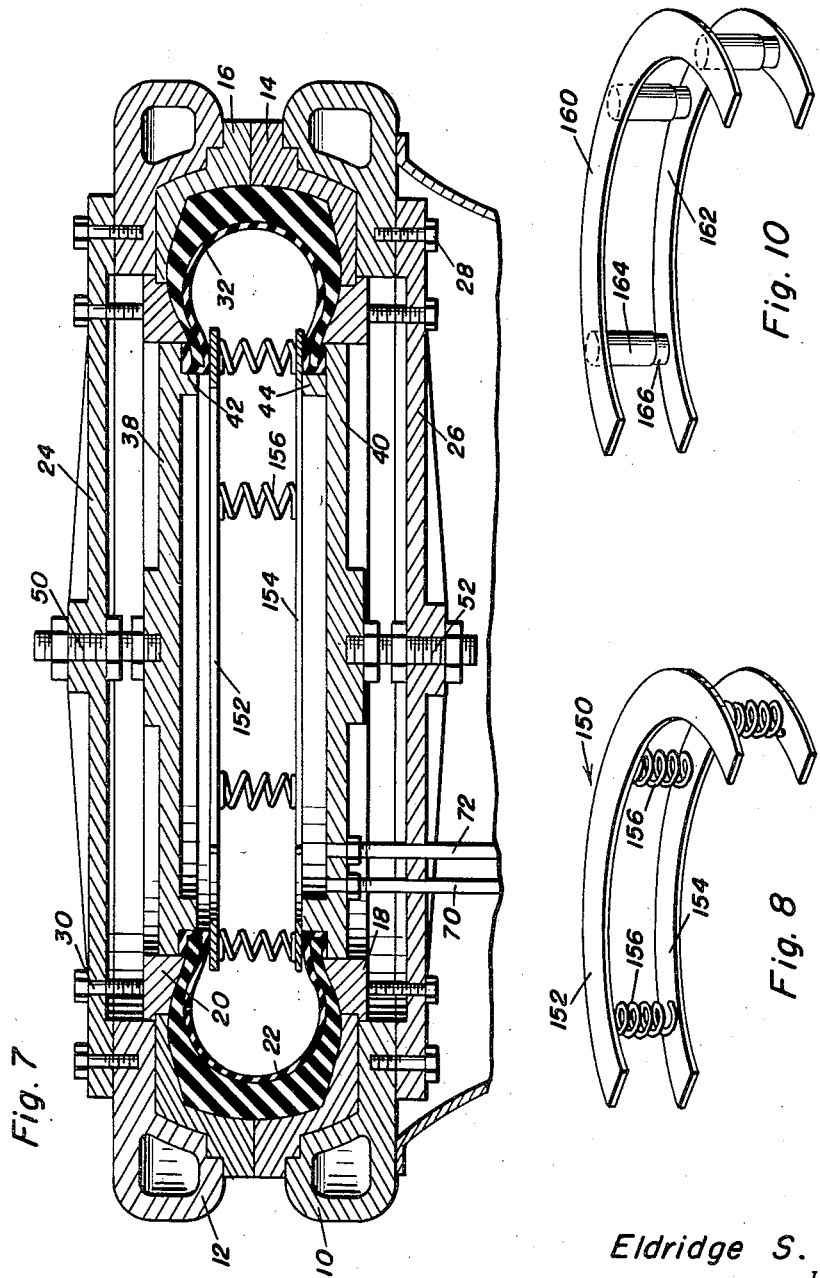

United States Patent Office 2,834,049
Patented May 13, 1958

2,834,049

TIRE RETREADING MOLD WITH MECHANICAL TIRE EXPANDER ASSEMBLY

Eldridge S. White, Florence, Ala., assignor to Robbins Tire and Rubber Company, Inc., Tuscumbia, Ala., a corporation of Alabama Application September 2, 1954, Serial No. 453,817

8 Claims. (Cl. 18—18)

This invention comprises novel and useful improvements in a tire retreading mold with mechanical tire expander assembly, and more specifically relates to an attachment for tire retreading molds for mechanically forcing the side walls of tires against the adjacent surfaces of the mold in an improved manner and independently of and without interfering with the introduction of fluids under pressure into the interior of the tire casing for retreading, heating or curing the same.

The primary object of this invention is to provide a mechanically operated tire expander assembly for use with tire retreading molds.

A further object of the invention is to provide an expander assembly which shall be capable of use either as a substitute for or as a supplement to a fluid pressure means for yieldingly urging the side walls of tires against the retreading mold.

Yet another object of the invention is to provide in a tire mold a mechanical means for yieldingly urging the side walls of a tire against the mold; and which may be utilized with or readily adapted for use with retreading molds for handling different sizes of tires.

Still another object of the invention is to provide a tire expander assembly as set forth in the foregoing objects which may be conveniently and compactly positioned between the beads of a tire for expanding the side walls of the tire as above mentioned.

Another important object of the invention is to provide a mechanical spreader assembly as set forth in the foregoing objects which shall employ a sliding, wedging action to lock the side walls of the tire against the mold surfaces.

Another very important object of the invention is to provide an assembly in accordance with the preceding objects and which shall in no way obstruct communication with the interior of the tire casing for the introduction of fluids thereto in the treating of tires in a mold.

A further object of the invention is to provide an assembly pursuant to the above mentioned objects in which the tire expanding elements are such as to admit of easy interchanging or replacement of the same as desired.

A still further specific object of the invention is to provide a tire expander assembly as set forth in the foregoing objects wherein the tire expanding means shall be of such construction as to center and position itself with respect to a tire being treated by the device.

These together with other objects and advantages which will become subsequently apparent as the following description proceeds reside in the details of construction and operation as more fully hereinafter described and claimed, reference being had to the accompanying drawings forming a part hereof, wherein like numerals refer to like parts throughout, and in which:

Figure 1 is a top plan view, somewhat diagrammatic in nature and with parts broken away, and with other parts shown in horizontal section of a tire retreading mold incorporating therein the principles of this invention and showing one embodiment of the tire expander assembly positioned therein;

Figure 3 is a detail view in vertical section and upon an enlarged scale of a portion of Figure 2;

Figure 4 is a perspective view of one of the tire expanding and spacer elements of the embodiment of Figures 1-3;

Figure 5 is a perspective view of one of the frames forming a part of the spacer and expander element of Figure 4;

Figure 7 is a fragmentary vertical transverse sectional view taken substantially upon the plane indicated by the section line 7—7 of Figure 6;

Figure 8 is a perspective view of a section of the tire expander and spacer ring of Figures 6 and 7;

Figure 10 is a perspective view of a section of the expander assembly or spacer ring of Figure 9.

Figure 2:
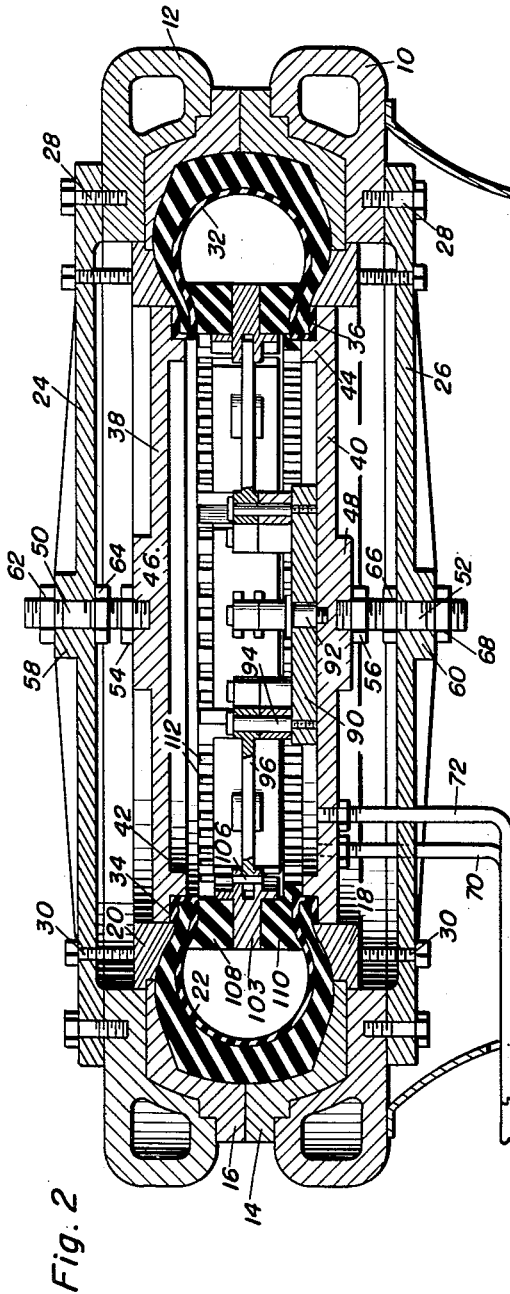
Figure 2 is a vertical transverse sectional view, taken substantially upon the plane indicated by the section line 2—2 of Figure 1 and showing the tire retreading mold in its closed position with a tire mounted therein and having the tire expander assembly of this invention operatively associated with the tire and with the mold.

The present invention relates to subject matter which is similar to that set forth in my copending applications Serial No. 376,804; Serial No. 454,132; Serial No. 447,081; and Serial No. 453,548. The principles of the present invention are concerned more particularly with the provision of a resilient expander or spacer assembly adapted to be disposed between the beads of a tire casing whereby when the mold sections are closed upon the tire casing in preparation of a tire retreading operation, the resilient expander or spacer assembly will yieldingly urge the beads of a tire outwardly against the mold sections and consequently will yieldingly bias the side walls and beads of a tire against the adjacent surfaces of the retreading mold. The resilient spring members or spring action of the expander assembly is of sufficient strength as to normally distend or expand the beads and side walls of a tire considerably beyond the position which they will occupy when the mold is closed, whereby the closing action of the mold sections of the mold will serve to compress the resilient expander assembly and thereby ensure the desired tight fitting contact of the side walls of the tire with the mold section.

The tire expander and spacer assembly as set forth in this application is especially adapted for use with the types of apparatuses disclosed in my above mentioned copending applications and which embody the use of a liner sleeve in the tire casing in order to render the casing impervious to fluids applied to the interior of the same for thereby pressing the tire against the matrices of the mold sections; and with the sealing plates which seat upon the rims or beads of a tire and thus close off the interior of the tire casing from the atmosphere to facilitate the application of fluid pressure to the interior of the tire casing.

The present invention is particularly characterized by the compact arrangement of the expander or spacer assembly, and the convenient manner for mounting the same upon conventional tire retreading apparatuses.

Referring first to the embodiment of Figures 1-5, wherein is disclosed by way of example one manner in which the principles of this invention may be applied to a conventional tire retreading mold, it will be noted that the retreading apparatus or mold consists of a stationary lower mold section 10 together with an upper movable mold section 12, the latter being hingedly mounted upon the lower section for opening and closing movement relative thereto in a manner well understood in the art and therefore requiring no further illustration in the present application.

The two mold sections are, of course, provided with removable or interchangeable liners or matrices 14 and 16 together with the annular sealing rings 18 and 20. The matrices and sealing rings, when entirely disposed in the mold and the two mold sections are in closed position in preparation for retreading or treating a tire, serve to confine the exterior surfaces of the tire within desired limits, to impress the tread upon the retreading material disposed upon the tire and serve to support the tire against its internal pressure during the retreading and curing operation.

The tire itself is indicated in the drawings by way of the numeral 22. Upon and lower support frames 24 and 26 are secured as by bolts 28 to the upper and lower mold sections and thus are disposed above and below the open central portion of the annular or ring-like retreading mold. By means of bolts 30, the upper and lower sealing rings 20 and 18 may be adjusted and properly positioned for a given size of tire. It is to be understood that the matrices 14, 16 and the spacer rings 20 and 18 may be of interchangeable sizes whereby the particular mold apparatus may be adapted for retreading operations upon different sizes of tires therein.

Also shown in the drawings is a sleeve liner 32 which is adapted to be received within the tire 22 and which renders the latter impervious to the passage of fluids therethrough during the retreading operation. The liner 32 is provided upon its rim portions with backturned flanges 34 which are adapted to embrace the bead portions 36 of the tire for establishing a fluid-tight engagement therewith.

At this point, it should be observed that the particular construction of the sleeve liner forms no part of the present invention, and this liner may conveniently be of the constructions disclosed in any of my above mentioned copending applications, and may be of the construction as claimed in my copending application Serial No. 464,132.

As in my preceding applications, sealing plates are employed to establish a fluid-tight seal with the beads of the tire and thus seal off the interior of the tire from communication with the atmosphere. Thus, upper and lower sealing plates 38 and 40 are provided, being snugly slidable within the central portion of the sealing rings 20 and 18, and having their adjacent surfaces adapted to engage the flanges 34 of the liner sleeve. These plates are also provided with annular ribs or rings 42 and 44 upon their adjacent surfaces which ribs are adapted to abut the ends of the liner sleeves as shown in Figures 2 and 3. Thus, the lower surface of the sealing plates and the outer surfaces of the rings serve to lock and retain the ends of the liner sleeves against the bead portions of the tires for establishing a fluid-tight engagement at that point.

The plates are provided with centrally disposed bosses 46 and 48 upon their outer surfaces, which bosses are internally threaded to receive the ends of bolts 50 and 52, lock nuts 54 and 56 being provided to secure the bolts to the sealing plates.

The bolts, in turn, extend through bores in the bosses 58 and 60 of the support frames 24 and 26, and are adjustable through these bosses, being retained in adjusted position, as by the locking nuts 62, 64 for the upper support frame and 66, 68 for the lower support frame.

As will now be apparent, by adjusting the bolts and lock nuts, the sealing plates 38 and 40 may be adjusted towards or from each other to give the desired spacing between these plates whereby when the upper mold sections close upon the lower mold section, a tire being disposed therebetween, these sealing plates will engage the flanges 34 on the sleeve liners and press the same against the outer surfaces of the tire beads.

The expander assembly or spacer ring to be hereinafter described is disposed between the adjacent surfaces of the beads of the tires and the latter are pressed firmly downwardly upon these beads by the action of the sealing plates when the mold sections are moved into their closed position, as shown in Figures 2 and 3.

As shown in Figures 1 and 2, fluid inlet and fluid discharge conduits 70 and 72 extend through the lower sealing plate 40 whereby fluid may be supplied into the cylindrical space between the sealing plates or may be withdrawn therefrom; and from the cylindrical space may pass into and out of the interior of the toroidal chamber within the tire casing. Air, a heating fluid and a cooling fluid are supplied from various suitable sources by means of pipes 74, 76 and 78 under the control of manual control valves 80 to the fluid inlet pipe 70. The air, heating fluid and cooling fluid are discharged from the interior of the apparatus by means of the pipes 82, 84 and 86 under their individual manual control valves 88 by means of the connection with the discharge conduit 72.

As set forth in my above mentioned copending applications, this manifolding arrangement permits compressed air to be supplied to the interior of a tire for expanding the same tightly against the mold surfaces and permits this pressure to be vented from the interior of the tire through the pipe 82 in order to release this pressure, as, for example, when the tire is to be withdrawn from the mold. The pipe 76 serves to supply a heating medium, such as steam or the like, to the interior of the tire to effect or to assist in the vulcanizing and curing operation; and this fluid may be discharged back to its source or to other suitable place by the pipe 84 when its presence is no longer desired. Finally, the pipe 78 may be employed to supply a cooling means, such as cold water or the like to the interior of the tire to quickly cool the same upon the completion of the retreading and curing operation, and this cooling medium may be discharged from the tire casing by the conduit 86.

The novel construction and processes involving this fluid manifold system forms no part of the invention claimed herein, and therefore has been described only briefly in order to illustrate the particular type of apparatus with which the present invention is concerned.

Referring now more particularly to Figure 2, it will be observed that the inside surface of the bottom sealing plate 40 has a control disk 90 pivotally secured thereto, as by a centrally disposed screw threaded pin 92. The disk 90 is thus mounted for oscillatory movement upon the flat inner surface of the bottom sealing plate 40. A plurality of crank pins 94 screw threadedly engage the plate 90 and extend upwardly therefrom adjacent the periphery of the plate, as shown in Figure 1. As shown in Figures 1, 2 and 4, the crank pins 94 have journaled thereon one end of a crank arm 96 whose other end is secured to the expander section 98 forming a part of the expander assembly.

Referring now more specifically to Figures 4 and 5, it will be seen that the expander section consists of an arcuate frame or shoe 100 which is T-shaped in cross-section, the stem of the T comprising an arcuate band 102. Extending inwardly from the concave side of the head of the T-shaped member 100 are a pair of apertured ears 104 between which is pivotally secured the other end of the connecting rod 96, as by a pivot pin 106. Mounted upon opposite sides of the stem 102 of the shoe or frame member of the expander section are upper and lower blocks 108 and 110 which are of a suitable resilient or yieldingly deformable material, such as rubber or the like. The opposed upper and lower surfaces of these blocks are provided with radially extending slots or notches 112 which constitute passages permitting flow of fluid from one side of the expander assembly to the other side thereof.

It should be further noted that the opposed upper and lower surfaces of the blocks are curved or contoured as at 116 and 118 and are given a shape which will conform to the adjacent sides of the tire beads. Further, the rate of curvature of the arcuate sections also conforms to the rate of curvature of the tire beads, whereby the arcuate surfaces may be snugly disposed between the two tire beads and the surfaces 116 and 118 will snugly conform to and engage the inner surfaces or sides of the tire beads, as shown in Figures 2 and 3.

It is contemplated that any desired number of the sections may be employed. A plurality of such sections are shown in Figure 1, and when disposed in a closely circumferentially spaced relation, they constitute, in substance, an annular member. The links of the crank arms 96 and the distance of the pins 94 from the center of plate 90 are such that when the plate 90 is rotated into a position where the crank arms extend substantially radially therefrom, the expander sections 98 are moved into the interior of the tire casing whereby the opposed surfaces 116 and 118 are within the tire and are in contact with the bead portions of the same. Alternatively, when the plate 90 is rotated to an extent where the crank arms 96 are disposed in non-radial positions, as shown in dotted lines in Figure 1, the expanded sections will all be moved towards the center of rotation, which is the center of the tire, thereby moving the sections towards the center and thus causing the opposed surfaces 116 and 118 to move out from the interior of the tire and thus out of contact with the tire beads.

By this inward movement of the expander sections into the tire, the beads and side walls of the tire are distended or forced apart due to the wedging action of the resilient blocks 108 and 110 when the mold sections are closed. Thus, by this means, a yielding resilient abutment is interposed between the beads of the tires so that when the mold sections are closed, the yielding abutment will be tightly compressed by the closing of the mold through the action of the sealing plates 38 and 40 upon the beads of the tire, and cause the spacer or expansion assembly to exert a constant outward pressure against the side walls and beads of the tire and thus hold the same firmly against the surfaces of the mold sections.

It should be noted, however, that the notches or passages 112 are of sufficient depth that they will remain open even though the mold is closed in the position shown in Figure 3, whereby fluid may pass from the cylindrical space between the sealing plates, through the expander sections and into the interior of the liner sleeve 32 disposed in the interior of the tire casing 22.

By this means, the tire casing will be firmly held in contact with the side walls of the mold by means of the resilient, yielding pressure of the sections of the expander assembly, whereby the various fluid pressures above mentioned may be supplied to the interior of the tire casing for tightly urging the casing against the mold sections; applying heat to the interior of the casing for effecting the retreading, vulcanizing and curing operation of the tire; and for applying a cooling medium to the interior of the tire for quickly cooling the same prior to removal of the tire casing from the mold apparatus.

It should be noted that the expander sections are moved inwardly or outwardly relative to the central axis of the tire or mold either manually or by any desired mechanism when the upper mold section is raised with the tire casing disposed in the lower section. After the sections have been adjusted by the operating means consisting of the members 90, 94 and 96, and with the sections disposed in engagement with the inside of the tire beads, the upper mold section is closed, thereby establishing a tight sealing engagement with the beads and side walls of the tire as above mentioned. After the operation of the retreading mold is completed, and the pressure has been released from the interior of the tire through the above mentioned manifold system, the upper mold section is raised, the plate 90 is rotated to cause the expander sections to move radially inwardly of the center of the plate and thus cause the same to be withdrawn from between the beads of the tire whereupon the tire and its liner sleeve can be removed from the mold.

In this embodiment, a plurality of sections are employed which may be simultaneously controlled from a common actuating mechanism. These sections have been illustrated and described as being of a deformable material to give the required resiliency to their engagement with the beads of a tire. It is, however, possible to substitute for the resilient deformable material of the sections a yieldable construction which will serve somewhat the same function. Two such forms of construction have been illustrated in a somewhat different embodiment in Figures 6–10. It should, however, be understood that in the embodiment of Figures 1–5, the expander sections 98 may be replaced by similar shaped members in which the resilient expansion means shown in Figures 6–10 are employed, and whereby the resilient action is obtained not by the deforming of a resilient yieldable material, but rather by the mechanical action of mechanically expanding members.

Figure 6:
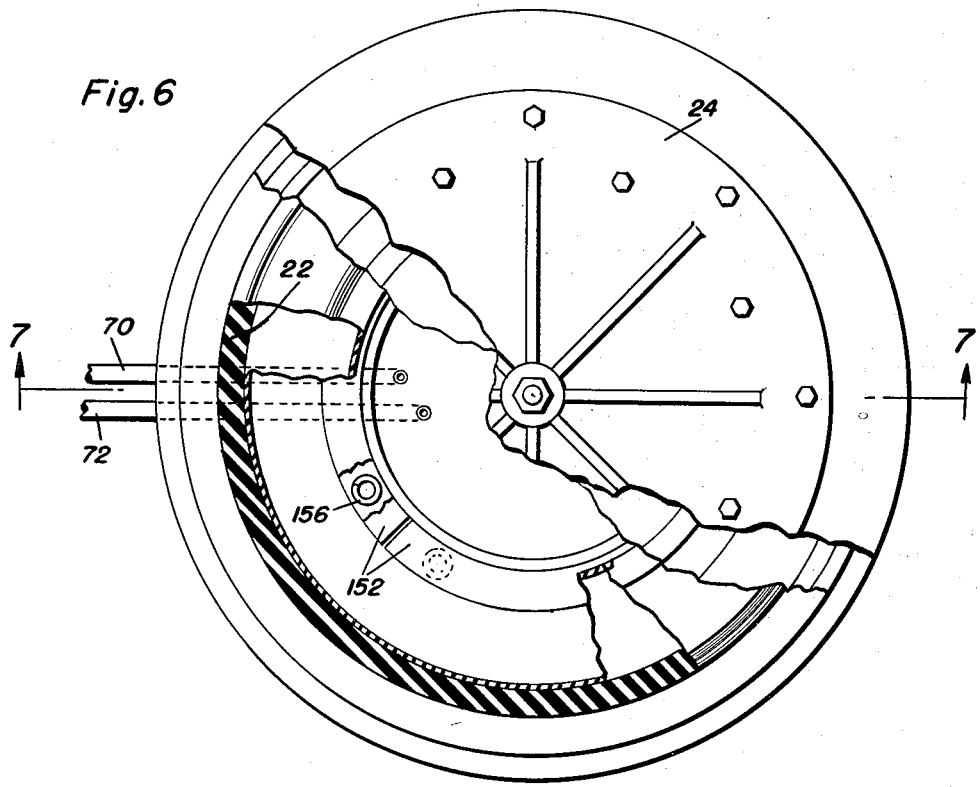
Figure 6 is a view similar to Figure 1 but of a modification incorporating therein a modified form of tire expander and spacer assembly.

Reference is now made to Figures 6–8 which disclose a modified embodiment of the resilient expander or spacer assembly. In this form, the same construction of mold apparatus is illustrated, the same reference numerals have been applied thereto, and a further description is unnecessary. In this embodiment, however, the expander assembly consists of a plurality of expander sections each indicated generally by the numeral 150. These sections may be of any desired circumferential extent, but for the purposes of illustration and for practical use, two semi-circular sections have been found to be adequate and are shown and described in these application papers. Each section consists of an arcuate, semi-circular upper and lower member 152 and 154, which are connected together by interposed coiled compression springs 156. The extremities of these springs may be anchored in any desired manner to the two members for securing the same together. The members have hard flat surfaces which, as shown in Figure 7, are adapted to be inserted between the beads of a tire after the latter is placed in the lower mold section. The outer surfaces of the members 152 and 154 will thus press the liner sleeve against the inner surface of the tire beads, and the latter, in turn, will press the flanges of the liner sleeves against the inner surfaces of the sealing plates 38 and 40. When the mold sections are closed, as shown in Figure 7, the sealing rings 20 and 18 together by the sealing plates carried by the mold sections will press the beads and side walls of the tire together against the resistance of the springs 156 of the expander sections. Thus, the expander sections will cause the beads and side walls of the tires to be pressed tightly against the surfaces of the mold in the same manner as the expander sections of the previously described embodiment.

In the preceding embodiment, the contoured surfaces 116 and 118 cooperated with the inside surfaces of the tire beads to center or properly position the expander assembly with respect to the tire. No such means is deemed to be necessary in the present instance since the inner and outer edges of the flat plate members 152 and 154 extend a sufficient distance inside the tire carcass to ensure a firm engagement of the expander section with the tire bead.

Since the plates 152 and 154 are spaced from each other, there is provided a passage between these plates which is open to permit passage of the fluids under pressure from the cylindrical space between the sealing plates to the interior of the tire, whereby the retreading, vulcanizing and curing operations may be effected.

Figure 9:
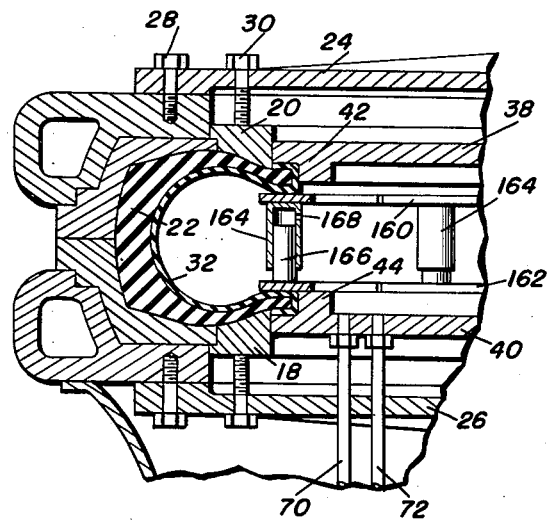
Figure 9 is a fragmentary detail view in vertical section of a portion of a tire molding apparatus employing a still further modification of the tire expander assembly therein.

Figures 9 and 10 show a still further modified construction of the expander assembly. This construction very closely resembles that of Figure 7 in that there are provided the same pair of upper and lower members 160 and 162 which are semi-circular and have flat, hard outer surfaces adapted to engage the inside walls of the tire beads. These members are secured together by resilient units, the same consisting of cylinders 164 secured to one plate and slidingly receiving plungers or pistons 166 carried by the other plate or member. A small dashpot 168 may be provided in the cylinders, as shown in Figure 9.

The cylinder and plunger assembly constitutes a pneumatic dashpot or pneumatic spring, and also functions as a guide to maintain the two members in alignment with each other. Obviously, when the mold sections are first closed, the movement of the plates 160 and 162 towards each other will compress the fluid within the cylinders, providing a pneumatic spring action similar to that of the springs 156.

In some instances, the opening 168 may be omitted.

It is also possible in the two embodiments of Figures 6–8 and Figures 9 and 10 to provide a means for centering the expander sections with reference to the mold apparatus. Thus, lugs, extending outwardly from the outer surfaces of the members 152, 154 or 160, 162 may be provided engageable with the ribs 42 and 44 of the sealing plates.

The embodiments of Figures 6–10 provide a somewhat simpler construction than that of Figures 1–5 in that no adjusting movement radially inwardly or outwardly is necessary to position the expander sections, which in Figures 6–10 will be manually placed between the beads of a tire when the mold is open and after the tire has been placed in the lower mold section. Once the mold is closed, the expander section will function as in the preceding embodiment.

From the foregoing, the construction and operation of the device will be readily understood and further explanation is believed to be unnecesary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a tire retreading mold having stationary and movable mold sections for receiving therein a tire for retreading the same, an expander assembly for distending the beads of a tire, said assembly including a plurality of circumferentially positioned arcuate expander sections each having opposed relatively oppositely inclined wedge shaped surfaces engageable with the adjacent sides of the beads of a tire, means for moving said sections radially inwardly towards the center of a tire and into expanding contact with the beads of a tire whereby to engage the tire side walls with the surfaces of the mold sections.

2. In a tire retreading mold having relatively movable mold sections, a tire expander assembly including a plurality of circumferentially positioned arcuate expander sections each having opposed relatively oppositely inclined wedge shaped surfaces engageable with the beads of a tire upon their adjacent sides, means for moving said sections radially inwardly towards the center of a tire and into contact with the tire beads whereby to engage the tire side walls with the mold sections' surfaces.

3. The combination of claim 1 wherein said sections are of such size as to allow their disposal between the beads of a tire, whereby when the mold sections are closed, said expander sections will be compressed and will yieldingly urge the tire side walls against the mold sections.

4. In combination with a tire retreading mold having stationary and movable mold sections for receiving therein a tire for retreading the same, an expander assembly for distending the beads of a tire, said assembly including an expander section having opposed relatively oppositely inclined wedge shaped surfaces engageable with the adjacent sides of the beads of a tire, means for moving said section radially inwards towards the center of a tire and into expanding contact with the tire beads whereby to engage the tire side walls with the surfaces of the mold sections, said means comprising a rotatable member mounted centrally of the mold, crank arms pivoted to said member and sections for moving said sections inwardly and outwardly of the rotational center of said rotatable member.

5. A tire expander assembly for use with a tire retreading mold comprising an arcuate and circumferentially extending expander section having opposed relatively oppositely inclined wedge shaped surfaces engageable with the adjacent inner faces of the beads of a tire, an arm connected to said section upon the concave side thereof, means connected to said arm for selectively and positively moving said section radially inwardly and outwardly with respect to the center of a tire whereby to cause said wedge shaped surfaces to wedgingly contact the beads of a tire to thereby engage the side walls of a tire against the retreading mold and to disengage said wedging contact and thereby release the pressure upon the tire beads.

6. The combination of claim 5 including channels in at least one of said opposed wedging surfaces extending thereacross from the radially inner to the radially outer edges thereof and establishing container communication from the interior of the tire to its exterior when said section is wedgingly engaged with said beads.

7. The combination of claim 5 wherein said section comprises a rigid frame, arcuate and circumferentially elongated in length, said arm being secured to said frame, blocks of resilient material secured to the opposite sides of said frame, said opposed wedging surfaces being disposed upon said blocks.

8. The combination of claim 7 including radially extending channels in at least one of the opposed wedging surfaces of at least one of said blocks establishing continuous communication between the interior and exterior of a tire when said section is wedgingly engaged with said beads.

References Cited in the file of this patent

UNITED STATES PATENTS

| | | |
|---|---|---|
| 1,608,933 | Gammeter | Nov. 30, 1926 |
| 1,713,658 | Hopkinson | May 21, 1929 |
| 1,982,674 | Laursen | Dec. 4, 1934 |
| 2,133,036 | Moricle | Oct. 11, 1938 |
| 2,571,258 | Kolins | Oct. 16, 1951 |
| 2,593,137 | Glynn | Apr. 15, 1952 |
| 2,736,059 | Frank | Feb. 28, 1956 |
| 2,741,799 | Heston | Apr. 17, 1956 |